United States Patent
Que et al.

(10) Patent No.: US 10,809,438 B2
(45) Date of Patent: *Oct. 20, 2020

(54) BACKLIGHT MODULE FOR CURVED LIQUID CRYSTAL DISPLAY DEVICE AND CURVED LIQUID CRYSTAL DISPLAY DEVICE

(71) Applicant: Shenzhen China Star Optoelectronics Technology Co., Ltd., Shenzhen, Guangdong (CN)

(72) Inventors: Chengwen Que, Guangdong (CN); Yuchun Hsiao, Guangdong (CN); Dehua Li, Guangdong (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/288,475

(22) Filed: Feb. 28, 2019

(65) Prior Publication Data
US 2019/0196087 A1 Jun. 27, 2019

Related U.S. Application Data

(63) Continuation of application No. 14/778,182, filed on Nov. 23, 2016, now Pat. No. 10,338,295.

(51) Int. Cl.
*F21V 8/00* (2006.01)
(52) U.S. Cl.
CPC ......... *G02B 6/0026* (2013.01); *G02B 6/0021* (2013.01); *G02B 6/0023* (2013.01); *G02B 6/0068* (2013.01)

(58) Field of Classification Search
CPC .. G02B 6/0026; G02B 6/0021; G02B 6/0068; G02B 6/0023
See application file for complete search history.

(56) References Cited

U.S. PATENT DOCUMENTS

| 5,881,200 A * | 3/1999 | Burt ................ B82Y 10/00 385/142 |
| 10,338,295 B2 * | 7/2019 | Que ................ G02B 6/0023 |

(Continued)

FOREIGN PATENT DOCUMENTS

| CN | 103824518 A | 5/2014 |
| CN | 103941475 A | 7/2014 |

(Continued)

OTHER PUBLICATIONS

PCTCN2015082277_International Search Report.

*Primary Examiner* — Isiaka O Akanbi
*Assistant Examiner* — Nathaniel J Lee
(74) *Attorney, Agent, or Firm* — Leong C. Lei

(57) ABSTRACT

A backlight module for curved liquid crystal display device and a curved liquid crystal display device are disclosed. The backlight module comprises a backplate, a light guide plate and a backlight source that are arranged in the backplate, and quantum tubes that are arranged between the light guide plate and the backlight source, wherein a fold line which matches a curved surface of the curved liquid crystal display device is formed by the quantum tubes. In the backlight module, the fold line that is formed by the quantum tubes can be fitted into a curved line so as to match the curved surface of the curved liquid crystal display device. The quantum tubes can be applied to the curved liquid crystal display device through this arrangement, whereby the color purity of the curved liquid crystal display device can be improved, and the color gamut thereof can be enlarged.

14 Claims, 2 Drawing Sheets

(56) References Cited

U.S. PATENT DOCUMENTS

2014/0119049 A1    5/2014  Kim
2014/0240644 A1*   8/2014  Abe ..................... G02B 6/0091
                                                        349/71
2017/0205047 A1*   7/2017  Cha ........................... F21V 7/04

FOREIGN PATENT DOCUMENTS

CN         104214608  A     12/2014
DE      202013011466  U1     4/2014

* cited by examiner

BACKLIGHT MODULE FOR CURVED LIQUID CRYSTAL DISPLAY DEVICE AND CURVED LIQUID CRYSTAL DISPLAY DEVICE

CROSS REFERENCE TO RELATED APPLICATION

This is a continuation application of co-pending U.S. patent application Ser. No. 14/778,182, filed on Nov. 23, 2016, which is a national stage of PCT Application No. PCT/CN2015/082277, filed on Jun. 25, 2015, claiming foreign priority of Chinese Patent Application No. 201510304446.8, entitled "Backlight Module for Curved Liquid Crystal Display Device and Curved Liquid Crystal Display Device", filed on Jun. 4, 2015, the entirety of which is incorporated herein by reference.

FIELD OF THE INVENTION

The present disclosure relates to the technical field of liquid crystal display device production, and particularly to a backlight module for curved liquid crystal display device and a curved liquid crystal display device.

BACKGROUND OF THE INVENTION

As one of the backlight technologies of high color gamut liquid crystal display device, the quantum dot backlight technology has drawn more and more attentions in recent years. In a liquid crystal display device with a quantum dot backlight source, a quantum tube is arranged in front of a blue Light-Emitting Diode (LED) light source. When blue light enters into the quantum tube, the quantum dots which are packaged in the quantum tube can emit red light and green light after being excited by the blue light. The red light and the green light, as well as part of the original blue light can mix into white light with high color saturation, which then enters into a light guide plate. In this case, the light with high color saturation can be provided to the liquid crystal display device, and thus the color performance ability of the display device can be improved. The color purity of the liquid crystal panel can be improved by the quantum tube, while the color density of the color filter does not need to be intensified. Therefore, the power consumption of the liquid crystal panel would not be increased. In addition, the color gamut of the liquid crystal panel can be enlarged, with an extent of 30 percent for example.

FIG. 1 is a sectional view in a vertical direction of a quantum tube in the prior art. FIG. 2 is a sectional view in a horizontal direction of a quantum tube in the prior art. As shown in FIG. 2, a quantum tube 10 generally comprises a function part 13 which plays the role thereof and is arranged in a middle part thereof, and a package part 14 which wraps the function part 13. The function part 13 is generally made of a material of the quantum dots, and the package part 14 is generally made of a glass material. In addition, it can be seen from FIG. 1 that, the quantum tube 10 comprises, along its longitudinal direction, an effective area 11 which plays the role thereof and is arranged in a middle part thereof, and a non-effective area 12 which is arranged at the two sides.

When the liquid crystal display device has a curved surface, the quantum tube can hardly be used in the display device because of the rigidity of the quantum tube. In the prior art, the quantum dots are generally arranged on the light source or other optical fiber materials, so that the color purity of the liquid crystal display device can be improved. However, the production of this kind of liquid crystal display device is complex, and the production cost thereof is relatively high. Moreover, the display effect of the whole display device is not satisfactory.

SUMMARY OF THE INVENTION

In order to solve the aforesaid technical problem in the prior art, the present disclosure provides a backlight module for curved liquid crystal display device and a curved liquid crystal display device which comprises the backlight module. According to the backlight module provided by the present disclosure, the quantum tube can be used in the curved liquid crystal display device, so that the color performance ability and the color gamut of the curved liquid crystal display device can both be improved. Meanwhile, the manufacturing procedure of the backlight module with this structure is simple, and the production cost thereof is low.

According to a first aspect of the present disclosure, it provides a backlight module for curved liquid crystal display device, comprising: a backplate; a light guide plate and a backlight source that are arranged in the backplate; and quantum tubes that are arranged between the light guide plate and the backlight source, wherein a fold line which matches a curved surface of the curved liquid crystal display device is formed by the quantum tubes.

Since the fold line is formed by the quantum tubes, the fold line can be fitted into a curved line so as to match the curved surface of the curved liquid crystal display device. Therefore, the quantum tubes can be used in the curved liquid crystal display device through this arrangement, whereby the color purity of the curved liquid crystal display device can be improved, and the color gamut thereof can be enlarged. Meanwhile, the production of the backlight module can be simplified, and the production cost thereof can be reduced.

According to one embodiment, two adjacent quantum tubes are overlapped with each other partly. Preferably, an effective area of one quantum tube of two adjacent quantum tubes extends to an effective area of the other quantum tube of the two adjacent quantum tubes. Through this arrangement, the backlight source can correspond to the effective area of the quantum tube. Therefore, with respect to a light-entering side of the light guide plate, a non-effective area of the quantum tube can be avoided.

According to one embodiment, grooves are arranged on a light-entering side of the light guide plate, and configured to be a stepped shape that matches the fold line formed by the quantum tubes. The positions of the quantum tubes are defined by the light guide plate through this arrangement. In this manner, the quantum tubes, which form a fold line shape, are convenient to be installed, and the operation thereof is simple.

According to one embodiment, the grooves comprise one middle groove or two middle grooves, and side grooves that are arranged on two sides of the middle groove(s) respectively, bottom surfaces of the grooves decreasing in sequence in a direction from the middle groove(s) to the side grooves. Through this arrangement, the grooves can be fitted into the curved line which matches the curved surface of the curved liquid crystal display device better. Meanwhile, the grooves with this structure are easy to be processed. In addition, with this arrangement, the positioning of the quantum tubes becomes more convenient to be performed.

According to one embodiment, the side grooves are symmetrical about the middle groove(s). The whole structure of the grooves can be simplified, and the manufacturing difficulty of the light guide plate can be reduced through this arrangement.

According to one embodiment, a bottom surface of each side groove is arranged to be an inclined surface which drops gradually in a direction from a middle part to two sides. The shape of the grooves can match the curved surface of the curved liquid crystal display device better through this arrangement.

According to one embodiment, the quantum tubes which match the side grooves at one side of the middle groove(s) are arranged in sequence in a same direction. Through this arrangement, the installation of the quantum tubes can be simplified, and thus the production cost thereof can be reduced.

According to one embodiment, a length of each quantum tube ranges from 1 cm to 20 cm. The quantum tubes can match the curved surface of the curved liquid crystal display device better through this arrangement.

According to a second aspect of the present disclosure, it provides a curved liquid crystal display device, which comprises the aforesaid backlight module.

Compared with the prior art, the following advantages can be brought about according to the present disclosure. In the backlight module according to the present disclosure, the fold line which matches the curved surface of the curved liquid crystal display device is formed by the quantum tubes, so that the technical problem in the prior art, i.e., in the curved liquid crystal display device, the quantum dots should be arranged on the light source or other optical fiber materials only, can be solved. In addition, the structure of the backlight module is simple, and the production cost thereof is low.

BRIEF DESCRIPTION OF THE DRAWINGS

The preferred embodiments of the present disclosure will be illustrated in detail hereinafter with reference to the drawings. In the drawings.

Figure 1:
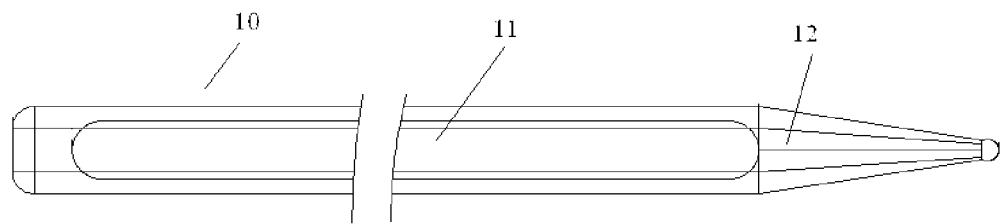
FIG. 1 is a longitudinally sectional view of a quantum tube in the prior art.
Figure 2:
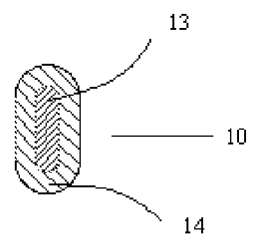
FIG. 2 is a cross-sectional view of the quantum tube in the prior art.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

Figure 3:
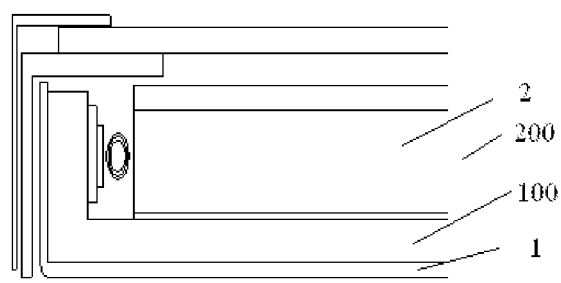
FIG. 3 is a sectional view of a curved liquid crystal display device according to one embodiment of the present disclosure.
Figure 5:
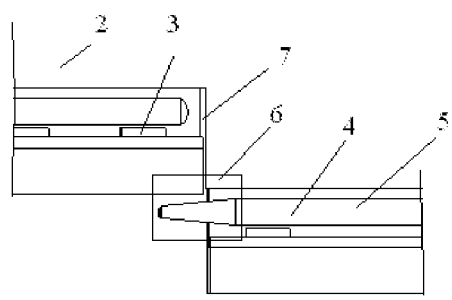
FIG. 5 is an enlarged diagram of area A of FIG. 4.
Figure 6:
FIG. 6 schematically shows a structure of a fold line formed by the quantum tubes according to the embodiment of the present disclosure.

FIG. 3 schematically shows a curved liquid crystal display device 200 according to the present disclosure. As shown in FIG. 3 and FIG. 5, the curved liquid crystal display device 200 comprises a backlight module 100, which comprises a backplate 1, a light guide plate 2 and a backlight source 3 that are both arranged in the backplate 1, and quantum tubes 4 that are arranged between the light guide plate 2 and the backlight source 3. Since the curved liquid crystal display device 200 has a curved surface, a fold line can be formed through connecting the quantum tubes 4 together so as to match the curved surface of the curved liquid crystal display device 200, as shown in FIG. 6. It should be noted that, the wording "connecting" is not limited by the case that the quantum tubes 4 are contacted with one another directly, but also includes the case that the quantum tubes 4 can be combined into a certain shape without contacting one another.

Since the quantum tubes 4 each are made of rigid materials, one single quantum tube 4 cannot be bent to conform to the curved surface of the curved liquid crystal display device 200. The fold line formed through connecting the plurality of quantum tubes 4 together can be fitted into a curved line so as to match the curved surface of the curved liquid crystal display device 200. In this manner, the quantum tubes 4 can be applied to the curved liquid crystal display device 200, whereby the color purity and color gamut of the curved liquid crystal display device 200 can both be improved. Meanwhile, the structure of the curved liquid crystal display device 200 is simple, and the production cost thereof is low.

According to the present disclosure, two adjacent quantum tubes 4 are overlapped with each other partly. Preferably, an effective area 5 of one quantum tube 4 of two adjacent quantum tubes 4 extends to an effective area 5 of the other quantum tube 4 of the two adjacent quantum tubes 4. In this manner, a non-effective area 6 of one quantum tube 4 can always overlap with the effective area 5 of another quantum tube 4, so that the backlight source 3 can correspond to the effective area 5 of the quantum tube 4. Therefore, the non-effective area 6 of the quantum tube 4 would not influence on the light-entering side of the light guide plate 2.

It should be noted that, the effective area 5 of one quantum tube 4 of two adjacent quantum tubes 4 does not have to extend to the effective area 5 of the other quantum tube 4 of the two adjacent quantum tubes 4 necessarily, as shown in FIG. 5. In this case, the relative position of the backlight source 3 and the quantum tubes 4 should be optimized. That is, it should be ensured that the backlight source 3 can correspond to the effective area 5 of the quantum tube 4.

Figure 4:
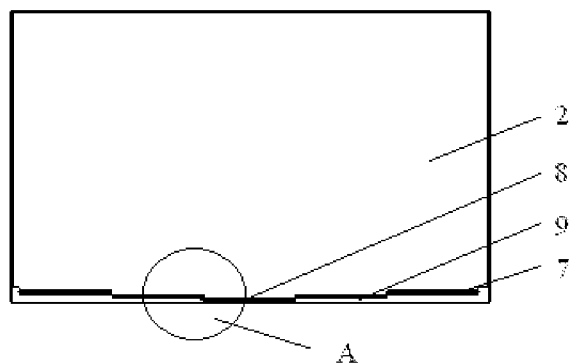
FIG. 4 schematically shows structures of a light guide plate and quantum tubes according to the embodiment of the present disclosure.

As shown in FIG. 4, grooves 7 are arranged on the light-entering side of the light guide plate 2. The grooves 7 are configured to be a stepped shape, so as to define the positions of the quantum tubes 4 and match the fold line formed by the quantum tubes 4. The quantity of the grooves 7 is equal to that of the quantum tubes 4. In this manner, the positions of the quantum tubes 4 are defined by the light guide plate 2, so that the quantum tubes 4 are convenient to be installed, and the operation thereof is simple. In addition, with the stepped shape configuration of the light-entering side of the light guide plate 2, it can be guaranteed that the quantum tubes 4 are overlapped with each other partly. Therefore, the non-effective area 6 of the quantum tube 4 would not influence on the light-entering side of the light guide plate 2.

As shown in FIG. 4, the grooves 7 comprise one middle groove 8 and side grooves 9 that are arranged on two sides of the middle groove 8. The bottom surfaces of the grooves 7 decrease in sequence in a direction from the middle groove 8 to the side grooves 9. That is, the grooves 7 are configured to be a stepped shape decreasing gradually in a direction from a middle part to two sides. Through this arrangement, the curved line formed by the grooves 7 through curve fitting can match the curved surface of the curved liquid crystal display device 200 better. Meanwhile, the grooves 7 with this structure are easy to be processed. In addition, with this arrangement, the positioning of the quantum tubes 4 becomes more convenient to be performed.

It should be noted that, the grooves 7 can also comprise two middle grooves 8 and side grooves 9 that are arranged on two sides of the middle grooves 8. The bottom surfaces of the grooves 7 decrease in sequence in a direction from the middle grooves 8 to the side grooves 9. The two quantum tubes 4 corresponding to the two middle grooves 8 can be arranged opposite to each other. In this case, the non-effective areas 6 of the quantum tubes 4 in the middle grooves 8 do not necessarily overlap with the effective area 5 of other quantum tube 4. Thus, the position of the backlight source 3 shall be arranged in a reasonable manner, so that the backlight source 3 does not correspond to the non-effective area 6 of the quantum tube 4.

In order to reduce the manufacturing difficulty of the light guide plate 2 and simplify the structure of the grooves 7, the side grooves 9 are arranged symmetrical about the middle groove(s) 8. Preferably, a bottom surface of each side groove 9 is arranged to be an inclined surface which drops gradually in a direction from a middle part to two sides. That is, the bottom surface of each side groove 9 is the inclined surface with one side near to the middle groove(s) 8 being higher and the other side being lower. The whole shape of the grooves 7 can match the curved surface of the curved liquid crystal display device 200 better through this arrangement.

It should be noted that, when there are two middle grooves 8, bottom surfaces of the middle grooves 8 each can also be arranged to be an inclined surface which drops gradually in the direction from the middle part to the two sides.

According to the present disclosure, as shown in FIG. 4, the quantum tubes 4 which match the side grooves 9 at one side of the middle groove(s) 8 are arranged in sequence in a same direction. That is, the quantum tubes 4 at the left side of the middle groove(s) 8 are arranged in sequence in a same direction. For example, the tip-shaped non-effective areas 6 of the quantum tubes 4 at the same side of the middle groove(s) 8 face a same direction. Preferably, the quantum tubes 4 are arranged symmetrical about the middle groove(s) 8. For example, the tip-shaped non-effective areas 6 of the quantum tubes 4 at the same side of the middle groove(s) 8 extend outwards. Through this arrangement, the installation of the quantum tubes 4 can be simplified, and thus the production cost thereof can be reduced. At the same time, the non-effective area 6 of the quantum tube 4 would not influence on the light-entering side of the light guide plate.

In order to guarantee the display effect of the curved liquid crystal display device 200, the fold line that is formed by the quantum tubes 4 should match the curved surface of the curved liquid crystal display device 200 closely. A length of each quantum tube 4 can range from 1 cm to 20 cm. In this case, the plurality of quantum tubes 4 with different lengths or the same length can be arranged according to a size of the curved liquid crystal display device 200, so that the quantum tubes 4 can match the curved surface of the curved liquid crystal display device 200 satisfactorily.

The curved liquid crystal display device 200 further comprises other structures and components, which are well known to those skilled in the art. The details of which are no longer repeated here.

The preferred embodiments of the present disclosure are stated hereinabove, but the protection scope of the present disclosure is not limited by this. Any changes or substitutes readily conceivable for those skilled in the art within the technical scope disclosed herein shall be covered by the protection scope of the present disclosure. Therefore, the protection scope of the present disclosure shall be determined by the scope as defined in the claims.

The invention claimed is:

1. A backlight module for curved liquid crystal display device, comprising:
   a backplate;
   a light guide plate and a backlight source that are arranged in the backplate; and
   quantum tubes that are arranged between the light guide plate and the backlight source, wherein a fold line which matches a curved surface of the curved liquid crystal display device is formed by the quantum tubes, wherein the quantum tubes are combined to form the fold line without contacting one another;
   wherein two adjacent quantum tubes are overlapped with each other partly;
   wherein an effective area of one quantum tube of two adjacent quantum tubes extends to an effective area of the other quantum tube of the two adjacent quantum tubes.

2. The backlight module according to claim 1, wherein grooves are arranged on a light-entering side of the light guide plate, and configured to be a stepped shape that matches the fold line formed by the quantum tubes.

3. The backlight module according to claim 2, wherein the grooves comprise one middle groove or two middle grooves, and side grooves that are arranged on two sides of the middle groove(s) respectively, bottom surfaces of the grooves decreasing in sequence in a direction from the middle groove(s) to the side grooves.

4. The backlight module according to claim 3, wherein the side grooves are symmetrical about the middle groove(s).

5. The backlight module according to claim 3, wherein a bottom surface of each side groove is arranged to be an inclined surface which drops gradually in a direction from a middle part to two sides.

6. The backlight module according to claim 5, wherein the quantum tubes which match the side grooves at one side of the middle groove(s) are arranged in sequence in a same direction.

7. The backlight module according to claim 1, wherein a length of each quantum tube ranges from 1 cm to 20 cm.

8. A curved liquid crystal display device, comprising a backlight module, which comprises:
   a backplate;
   a light guide plate and a backlight source that are arranged in the backplate; and
   quantum tubes that are arranged between the light guide plate and the backlight source, wherein a fold line which matches a curved surface of the curved liquid crystal display device is formed by the quantum tubes, wherein the quantum tubes are combined to form the fold line without contacting one another;
   wherein two adjacent quantum tubes are overlapped with each other partly;
   wherein an effective area of one quantum tube of two adjacent quantum tubes extends to an effective area of the other quantum tube of the two adjacent quantum tubes.

9. The curved liquid crystal display device according to claim 8, wherein grooves are arranged on a light-entering side of the light guide plate, and configured to be a stepped shape that matches the fold line formed by the quantum tubes.

10. The curved liquid crystal display device according to claim 9, wherein the grooves comprise one middle groove or two middle grooves, and side grooves that are arranged on two sides of the middle groove(s) respectively, bottom surfaces of the grooves decreasing in sequence in a direction from the middle groove(s) to the side grooves.

11. The curved liquid crystal display device according to claim 10, wherein the side grooves are symmetrical about the middle groove(s).

12. The curved liquid crystal display device according to claim 10, wherein a bottom surface of each side groove is arranged to be an inclined surface which drops gradually in a direction from a middle part to two sides.

13. The curved liquid crystal display device according to claim 12, wherein the quantum tubes which match the side grooves at one side of the middle groove(s) are arranged in sequence in a same direction.

14. The curved liquid crystal display device according to claim 8, wherein a length of each quantum tube ranges from 1 cm to 20 cm.

\* \* \* \* \*